(12) United States Patent
Wiley et al.

(10) Patent No.: US 8,911,161 B2
(45) Date of Patent: Dec. 16, 2014

(54) THERMAL MECHANICAL DIFFUSION SYSTEM AND METHOD

(75) Inventors: Robert G. Wiley, Franklin, TN (US); Brett Clark, Whites Creek, TN (US); John Lower, Lewisburg, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 520 days.

(21) Appl. No.: 13/350,274

(22) Filed: Jan. 13, 2012

(65) Prior Publication Data

US 2012/0183265 A1 Jul. 19, 2012

Related U.S. Application Data

(60) Provisional application No. 61/432,697, filed on Jan. 14, 2011.

(51) Int. Cl.
*G02B 6/255* (2006.01)

(52) U.S. Cl.
CPC ............ *G02B 6/2551* (2013.01); *G02B 6/2552* (2013.01)
USPC .......................................................... 385/96

(58) Field of Classification Search
None
See application file for complete search history.

(56) References Cited

U.S. PATENT DOCUMENTS

| | | | |
|---|---|---|---|
| 2,817,695 A | 12/1957 | Hartwig | |
| 3,761,764 A | 9/1973 | Brady | |
| 3,886,343 A | 5/1975 | Desautels et al. | |
| 3,960,531 A | 6/1976 | Kohanzadeh et al. | |
| 4,049,414 A | 9/1977 | Smith | |
| 5,018,824 A | 5/1991 | Ooe et al. | |
| 5,167,685 A | 12/1992 | Fukuma et al. | |
| 5,560,760 A | 10/1996 | Toeppen | |
| 6,333,071 B1 | 12/2001 | Kobayashi et al. | |
| 6,742,939 B2 | 6/2004 | Sykora et al. | |
| 6,886,998 B2 | 5/2005 | Kasuu et al. | |
| 7,317,171 B2 | 1/2008 | Wiley | |

(Continued)

FOREIGN PATENT DOCUMENTS

| | | |
|---|---|---|
| EP | 0262303 | 4/1988 |
| EP | 0480453 | 4/1992 |

(Continued)

OTHER PUBLICATIONS

Japanese Office Action dated Mar. 13, 2012 issued in corresponding Japanese Application No. 2009-549238.

(Continued)

*Primary Examiner* — Sarah Hahm
(74) *Attorney, Agent, or Firm* — Onello & Mello, LLP

(57) ABSTRACT

Provided is a thermal mechanical diffusion system and method. In accordance with the present invention, one end of a fiber under tension is vibrated while a portion of the fiber is heated. A push-pull action of one end of the fiber forces increased (or rapid) diffusion of dopants in the portion of the fiber that is in a heat zone, which receives the heat. By controlling the amplitude and frequency of the vibration, a diffusion profile of one or more fibers can be dictated with precision. Heat sources having narrower thermal profiles can enable greater precision in dictating the diffusion profile. As an example, this can be particularly useful for creating a diffusion taper within a fiber to be spliced, where the taper is a result of thermal expansion of the fiber core. Diffusion can occur much more rapidly than is typical.

26 Claims, 7 Drawing Sheets

(56) References Cited

U.S. PATENT DOCUMENTS

| | | | |
|---|---|---|---|
| 7,342,198 | B2 | 3/2008 | Wiley |
| 7,555,188 | B2 | 6/2009 | Wiley |
| 7,670,065 | B2 | 3/2010 | Clark et al. |
| 7,922,400 | B2 | 4/2011 | Clark et al. |
| 7,985,029 | B2 | 7/2011 | Wiley et al. |
| 8,644,651 | B2 * | 2/2014 | Dougherty et al. ............... 385/7 |
| 2002/0176673 | A1 | 11/2002 | Kasuu et al. |
| 2005/0223748 | A1 | 10/2005 | Ames et al. |
| 2006/0263016 | A1 | 11/2006 | Wiley et al. |
| 2007/0031098 | A1 | 2/2007 | Wiley et al. |
| 2007/0045249 | A1 | 3/2007 | Wiley |
| 2007/0193983 | A1 | 8/2007 | Wiley |
| 2008/0187273 | A1 | 8/2008 | Clark et al. |
| 2010/0135621 | A1 | 6/2010 | Wiley et al. |
| 2010/0226613 | A1 | 9/2010 | Clark et al. |
| 2011/0277511 | A1 | 11/2011 | Wiley et al. |
| 2012/0183266 | A1 | 7/2012 | Wiley et al. |

FOREIGN PATENT DOCUMENTS

| | | |
|---|---|---|
| JP | 52-17039 | 2/1977 |
| JP | 55-91507 | 6/1980 |
| JP | 56-78812 | 6/1981 |
| JP | 58091403 | 5/1983 |
| JP | 62210410 | 9/1987 |
| JP | 2-7006 | 1/1990 |
| JP | 2118606 | 5/1990 |
| JP | 02208242 | 8/1990 |
| JP | 02287409 | 11/1990 |
| JP | 5-70166 | 3/1993 |
| JP | 05333227 | 12/1993 |
| JP | 111160565 | 6/1999 |
| JP | 2001124949 | 5/2001 |
| JP | 2001166175 | 6/2001 |
| JP | 200222898 | 1/2002 |
| JP | 2005263523 | 9/2005 |
| TW | 244338 | 4/1995 |
| WO | 2008098119 | 8/2008 |
| WO | 2011087508 | 7/2011 |
| WO | 2012097271 | 7/2012 |
| WO | 2012099883 | 7/2012 |

OTHER PUBLICATIONS

International Search Report dated Jun. 27, 2008 issued in corresponding International Application No. PCT/US2008/053305.
Halfpenny D.R., Kane D.M., "Electric-arc cleaning of optical-fiber endfaces", Applied Optics, 1996, vol. 35 Issue 22, pp. 4516-4517.
Furukawa Electric, "Fusion Splicers and Tools", FITEL, vol. 3, Oct. 2009, pp. 1-32.
International Search Report dated Aug. 30, 2010 issued in corresponding International Application No. PCT/US2010/021197.
International Search Report dated May 31, 2012 issued in corresponding International Application No. PCT/US2012/021277.
International Search Report dated Mar. 14, 2012 issued in corresponding International Application No. PCT/US2012/021559.
International Search Report and Written Opinion dated Jan. 20, 2014, issued in corresponding International Application No. PCT/US2013/035665.
Extended European Search Report dated Apr. 23, 2014 issued in corresponding European Application No. 08729281.9.

* cited by examiner

THERMAL MECHANICAL DIFFUSION SYSTEM AND METHOD

RELATED APPLICATIONS

The present application claims priority under 35 USC 119(e) from U.S. Provisional Patent Application 61/432,697 filed Jan. 14, 2011, entitled THERMAL MECHANICAL DIFFUSION SYSTEM AND METHOD. The present application may be considered related to U.S. patent application Ser. No. 12/715,010 (US Pub. 2010-0226613 A1) filed Mar. 1, 2010, which is a continuation of U.S. Pat. No. 7,670,065, issued Mar. 2, 2010, which claimed priority to U.S. Provisional Patent Applications 60/888,691 filed Feb. 7, 2007, 60/953,803 filed Aug. 3, 2007, and 60/976,859 filed Oct. 2, 2007; and U.S. patent application Ser. No. 12/688,489 (US Pub. 2010-0135621 A1) filed Jan. 15, 2010, which is a CIP of U.S. Pat. No. 7,670,065, issued Mar. 2, 2010, which claimed priority to U.S. Provisional Patent Applications 60/888,691 filed Feb. 7, 2007, 60/953,803 filed Aug. 3, 2007, and 60/976,859 filed Oct. 2, 2007—each of which is incorporated herein in its entirety.

FIELD OF INTEREST

The present inventive concepts relate the field of systems and methods used for processing such materials as optical fibers, for example, systems and methods used for cleaving, splicing, tapering, diffusion, other thermal processing, and the like of optical fiber strands, cables, and so on.

BACKGROUND

As known by those skilled in the art, ideally two fibers (i.e., optical fibers) being spliced together should have the same numerical aperture ("NA"). This is true even if the fiber cores are different size. Thus, NA is a critical parameter when splicing fibers.

Generally, in fiber optics NA is a dimensionless number that characterizes the range of angles over which the fiber can accept or emit light, and is given by the formula:

$$NA = \sqrt{n_1^1 - n_2^2},$$

where n1 is the refractive index of the fiber core and n2 is the fiber index of the cladding. The fiber core and cladding tend to have slightly different make ups, which results in the different refractive indexes. See FIG. 1 for an example.

Selectively changing the NA of an optical fiber typically involves changing the refractive index and diameter of the core. This can be accomplished by applying a flame having a width of about 5 mm-6 mm to a fixed fiber. The fiber is heated at its melting temperature for a relatively long time, i.e., several minutes or more, until the cladding and core start to blend—thereby changing the refractive index of the core by diffusion of dopants therein. An end of the fiber can also be pulled, so that the diameter of the fiber is also selectively reduced, also referred to as "tapering."

The heated portion is cleaved at the center of the thermal profile, which is generally Gaussian. Therefore, assuming the flame has a width of about 5 mm, a cleave can be made at about 2.5 mm from each end of the thermal profile. See FIG. 2.

This process works relatively well for an individual fiber. However, because using such a flame takes several minutes or more to achieve the necessary diffusion, this cannot be done quickly. Slow diffusion means less yield and higher cost.

Also, the stationary flame with a fixed flame width presents limitations with respect to achievable thermal profiles that can be used for diffusion. And the same flame is used regardless of the core diameter.

SUMMARY OF INVENTION

In accordance with one aspect of the present disclosure, provided is a thermal mechanical diffusion system and method. One end of a fiber (or fiber bundle) under tension is vibrated while a portion of the fiber is heated. The push and pull of at least one end of the fiber forces increased diffusion of dopants in the core in the portion of the fiber that is in the heat zone. Thus, by precisely controlling the amplitude and frequency of the vibration, a diffusion profile of one or more fibers can be dictated with precision. Also, diffusion can occur much more rapidly than is typical. As an example, this can be particularly useful for creating a diffusion taper within a fiber to be spliced, where the taper is a result of thermal expansion of the fiber core.

In accordance with one aspect of the invention, first and second portions of a fiber (or fiber bundle) are respectively secured with a first fiber holder and a second fiber holder. The first fiber holder is coupled to a vibration mechanism. A heat source applies heat to an area of the fiber between the two fiber holders. The vibration mechanism causes predetermined vibration of the first fiber holder, with the fiber experiencing a resulting push and pull from the first fiber holder. As a result, rapid diffusion occurs in the fiber core.

The second fiber holder can maintain the second portion of the fiber in a fixed position.

The heat source can create a substantially uniform heated field about the fiber.

The heat source can be a multi-electrode heat source having three to more electrodes.

The heat source can be a two electrode heat source.

The heat source can include a flame. The flame can be applied directly to the fiber, or applied to a crucible that surrounds the fiber.

The heat source can be a filament heat source that substantially surrounds the fiber. The filament heat source can include a Tungsten or graphite filament.

The heat source can include a laser. The laser can be a CO2 laser. The CO2 laser can be a 10 μm laser.

The rapid diffusion can take place in not more than about 1 minute, as an example, rapid diffusion can take place in less than 10 seconds.

A frequency of the vibration can be 1-100 Hz.

In some cases, a frequency of the vibration can be more than 100 Hz.

An amplitude of the vibration can be between about 1-100 μm. As an example, the amplitude vibration can be 1-25 μm.

In some cases, an amplitude of the vibration can be more than about 100 μm.

A heated field according to a thermal profile of the heat source can be about 5-6 mm in width.

A heated field according to a thermal profile of the heat source can be about 1 mm or less in width. As an example, the heated field can be about 500 μm in width.

The area of the fiber receiving the heat can be a heat zone. The heat zone can be wider than the heated field of the heat source.

The vibration mechanism can be at least one piezo actuator.

The fiber can be more than one fiber.

The rapid diffusion can be applied to more than one area of the fiber. The rapid diffusion can be applied to a first area of the fiber, then an adjacent second area of the fiber, and so on. The areas can overlap.

The vibration amplitude and/or vibration frequency can be programmable. Temperature, diffusion profile, and areas to be heated can also be programmable.

In accordance with another aspect of the invention, provided is a thermal mechanical diffusion system useful to achieve rapid diffusion in optical fibers. The system comprises a first fiber holder, configured to secure a first portion of at least one fiber; a second fiber holder, configured to secure a second portion of the at least one fiber; a vibration mechanism coupled to the first fiber holder, and configured to provide vibratory motion of the first fiber holder with respect to the second fiber holder; and a heat source configured to apply heat to a portion of the at least one fiber disposed between the two fiber holders during the vibratory motion.

The vibration mechanism can include at least one piezo actuator.

The vibration mechanism can be configured to cause a predetermined vibration of the first fiber holder.

The vibration mechanism can be configured to cause a push-pull action on the at least one fiber.

The second fiber holder can be configured to maintain the second portion of the fiber in a fixed position relative to the first fiber holder.

A frequency of the vibration can be in a range of about 1 Hz-100 Hz.

An amplitude of the vibration can be in a range of about 1 μm-100 μm.

The amplitude of vibration can be in a range of about 1-25 μm.

The heat source can be configured to generate a substantially uniform heated field about the fiber.

The heat source can have a thermal profile of about 1 mm or less.

The heat source can have a thermal profile in a range of about 5-6 mm.

The heat source can be a multi-electrode heat source having at least two electrodes.

The heat source can be 3 electrodes.

The heat source can be a filament heat source that substantially surrounds a circumference of the at least one fiber.

The heat source can be a $CO_2$ laser.

A portion of the fiber receiving the heat can be a heat zone, and the heat zone can be wider than the heated field of the heat source.

In accordance with another aspect of the invention, provided is a method of causing rapid thermal diffusion in optical fibers. The method comprises securing a first portion of at least one fiber in a first fiber holder; securing a second portion of the at least one fiber in a second fiber holder; and vibrating the first fiber holder with respect to the second fiber holder, while applying heat to a portion of the at least one fiber disposed between the two fiber holders to achieve diffusion of dopants within the at least one fiber.

The method can further comprise performing the vibrating and heating to more than one area of the fiber.

The method can further comprise controlling at least one of a vibration amplitude and a vibration frequency with a programmable computer.

The method can further comprise controlling a thermal profile of the heat source with a programmable computer.

The method can further comprise controlling a diffusion profile of the at least one fiber with a programmable computer.

The method can further comprise diffusing the dopants within the at least one fiber by performing the vibration and heating for not more than about 1 minute.

The method can further comprise diffusing the dopants within the at least one fiber by performing the vibration and heating for not more than about 10 seconds.

The heat source can generate a substantially uniform heated field about the at least one fiber.

The heat source can have a thermal profile of about 1 mm or less.

The heat source can be a multi-electrode heat source having at least two electrodes.

The vibration can be caused by at least one piezo having a frequency of vibration in a range of about 1 Hz-100 Hz.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENT

Figure 1:
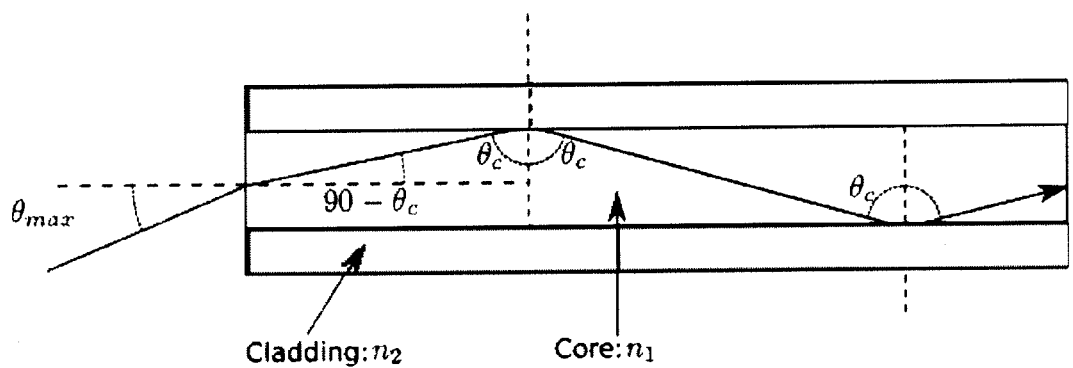
FIG. 1 is a drawing of an optical fiber core and cladding, according to the prior art.
Figure 2:
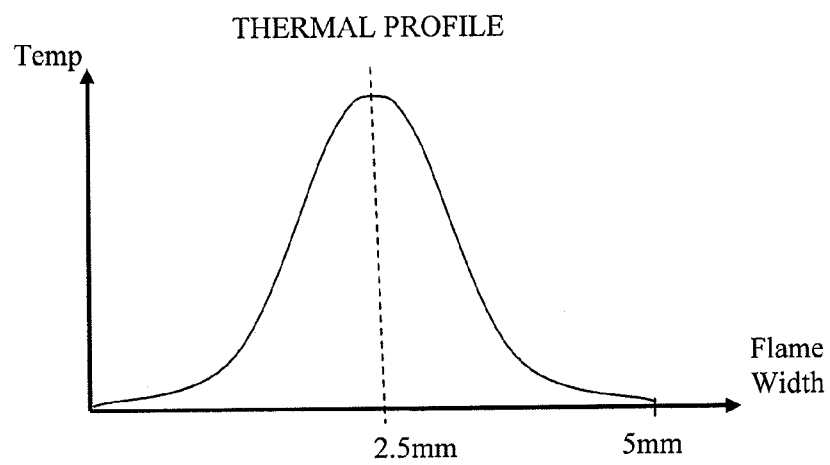
FIG. 2 is a plot of a Gaussian thermal profile of a typical flame used for diffusion, according to the prior art.

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Diffusion in a fiber that is accomplished in accordance with the present invention is more rapid and a diffusion profile can be more precisely dictated than with prior systems. Therefore, the numerical aperture (NA) of a fiber can be changed more rapidly and with greater precision. As a result, the NAs of fibers intended to be spliced together can be much more precisely matched in a shorter amount of time, using less energy.

Figure 3:
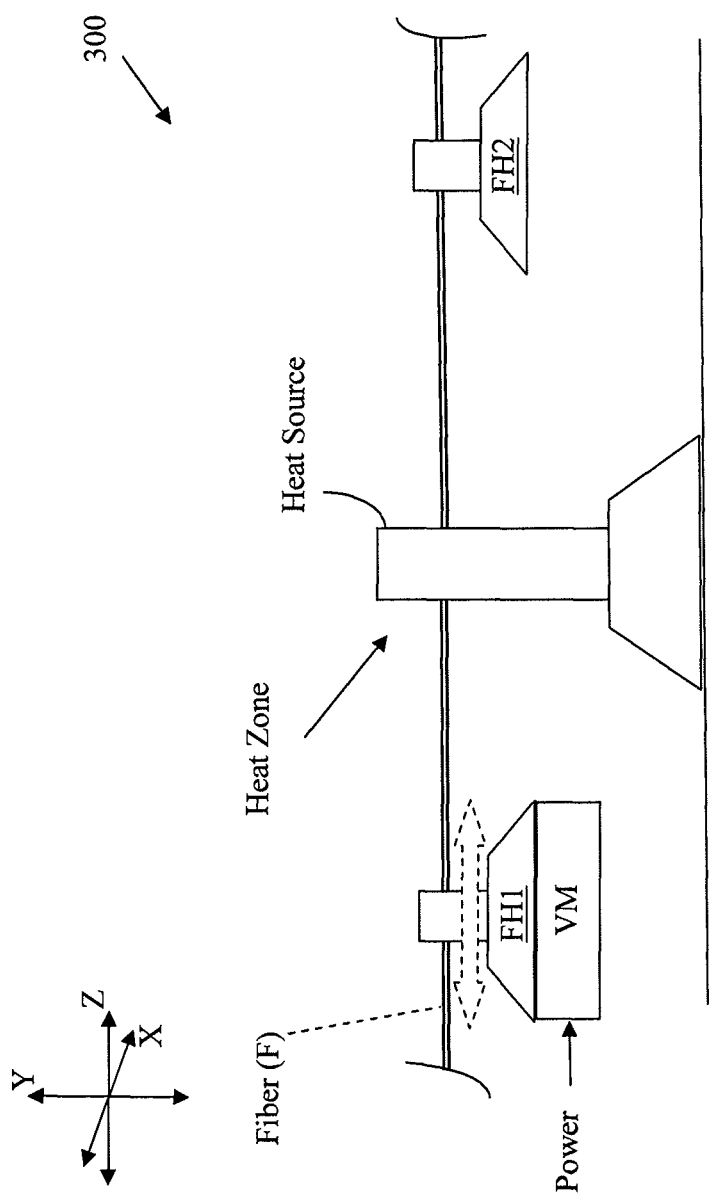
FIG. 3 is a view of an embodiment of a thermal mechanical diffusion system, according to aspects of the present invention.
Figure 5:
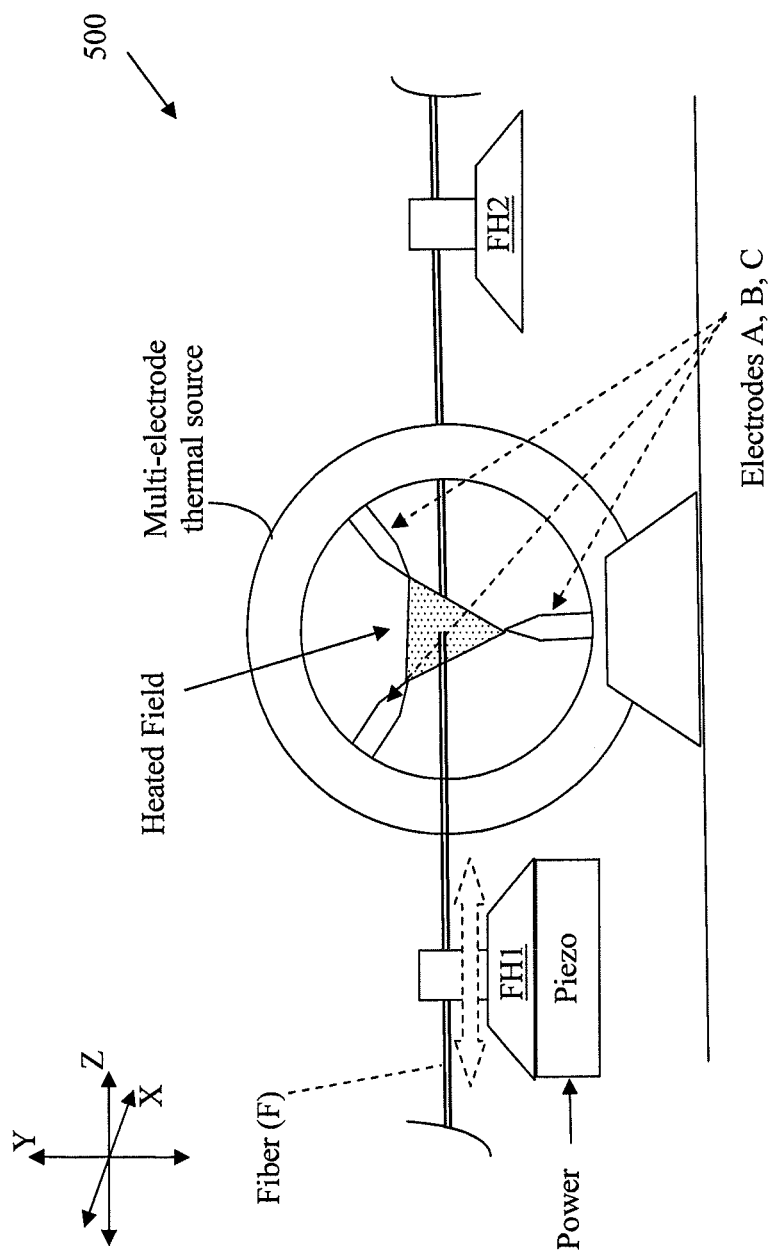
FIG. 5 is a view of an embodiment of a thermal mechanical diffusion system, using a 3 electrode Y configuration, according to aspects of the present invention.
Figure 6:
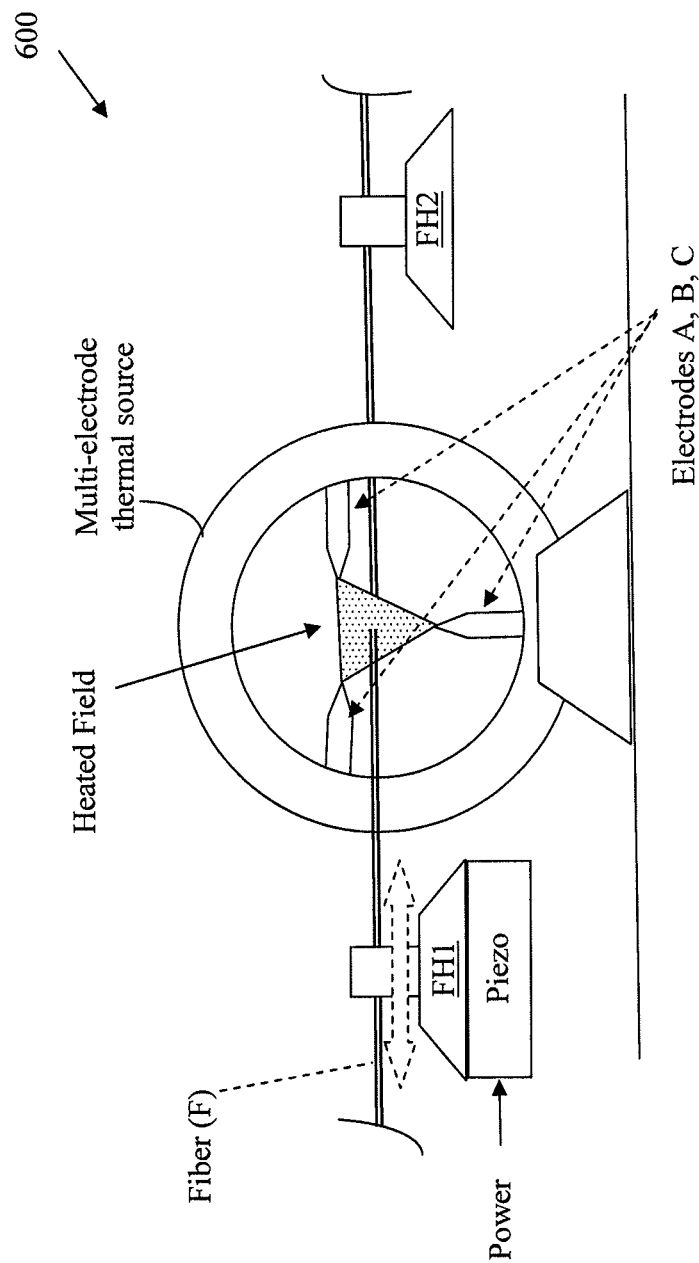
FIG. 6 is a view of an embodiment of a thermal mechanical diffusion system, using a 3 electrode T configuration, according to aspects of the present invention.
Figure 7:
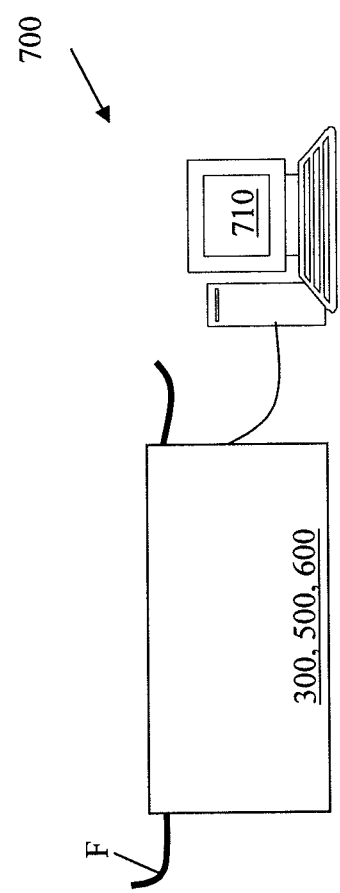
FIG. 7 is an embodiment of a programmable thermal mechanical diffusion system, according to aspects of the present invention.

In accordance with one aspect of the present disclosure, provided is a thermal mechanical diffusion system and method. FIGS. 3, 5, and 6 provide example embodiments of thermal mechanical diffusion systems and FIG. 7 provides an example embodiment of a thermal mechanical diffusion method, in accordance with aspects of the present invention. Unlike prior systems, one end of a fiber under tension is vibrated while a portion of the fiber is heated. The push and pull of one end of the fiber forces increased diffusion in the portion of the fiber that is in the heat zone. Thus, by precisely controlling the amplitude and frequency of the vibration, a diffusion profile of one or more fibers can be dictated with precision. Also, diffusion can occur much more rapidly than is typical.

FIG. 3 shows a side view of an embodiment of a thermal mechanical diffusion system 300, according to aspects of the present invention. In this embodiment, first and second portions of at least one fiber or fiber bundle (collectively "fiber F") are respectively secured with a first fiber holder FH1 and a second fiber holder FH2. The first fiber holder FH1 is coupled to a mechanical vibration mechanism VM. A heat source applies heat to an area of the fiber F between the two fiber holders FH1, FH2. The vibration mechanism causes predetermined vibration of the first fiber holder FH1, with fiber F experiencing a resulting push and pull from the first fiber holder FH1.

The push and pull, or vibration, causes tension then release of the fiber in small increments, over a plurality of cycles. This mechanical vibration forces increased diffusion in the heat zone, beyond that which would result from only applying heat. As a result, rapid diffusion occurs in the core of fiber F. This, for example, can result in controlled expansion of the core—creating a diffusion taper. For instance, where diffusion using a prior art approach could take tens of minutes, the present invention could achieve a similar, if not better result, in tens of seconds, or less—while using substantially the same temperature. But because the duration would be far shorter using the present invention, significant energy would be saved.

In FIG. 3, fiber F is along a Z axis, and the motion of the vibration mechanism is preferably also along the Z axis, in the presently preferred embodiment. This is depicted by the double arrow superimposed over fiber holder FH1. In this embodiment, fiber holder FH2 is stationary so that the second portion of the fiber secured therein does not move. Again, this is presently preferred in this embodiment. As an example, the vibration mechanism can be a piezo actuator or mechanism, to which power is applied to create the necessary vibration. In other embodiments, different types of vibration mechanisms could be used.

The vibration mechanism, e.g., piezo, can respond to the applied power by vibrating, such vibration having an amplitude and frequency that can be a function of the input power. The diffusion profile in fiber F will be a function of the amplitude and vibration of the vibration mechanism, as well as the diameter and makeup of fiber F, as well as the thermal profile of the heat source (width and peak temperature). Assuming that the thermal profile of the heat source is unchanged and the physics of the fiber are inherent, modulating the amplitude and frequency of the vibration can have significant impacts in otherwise dictating the diffusion profile in the fiber. This can be done selectively to, for example, create a desired thermal expansion taper within a fiber. And multiple areas of a fiber can be subjected to thermal mechanical diffusion to different degrees, creating different amounts of diffusion in each area. The areas can overlap if necessary to create the desired diffusion profile.

A frequency of the vibration can be 1-100 Hz, but the present invention is not limited to such a range. A frequency of the vibration can be more than 100 Hz, if desired or useful.

An amplitude of the vibration can be between about 1-100 μm. That is, the vibration mechanism can have a range of movement of 1-100 μm. As an example, in some situations it may be desirable to have the amplitude vibration be 1-25 μm. But there is no inherent limitation, an amplitude of the vibration can be more than 100 μm if necessary or desirable.

Ultimately, the choice of vibration amplitude and frequency may depend largely of the fiber F, desired diffusion profile, and/or thermal profile of the heat source.

With a typical heat source, the thermal profile is Gaussian, where the heat source delivers a heated field according to its Gaussian thermal profile. For example, a flame heat source can produce a heated field having a width of about 5-6 mm. A three-electrode can produce a heated field having a width of about 1 mm or less, e.g., about 500 μm.

Using the described vibration mechanism, the heat zone (i.e., heated portion of the fiber) can be wider than the heating field width of the heat source. A three-electrode heat source provides a heated field having a relatively narrow width. Therefore, greater precision would be possible than with a flame that produces a heated field having a width of about 5-6 mm.

Figure 4:
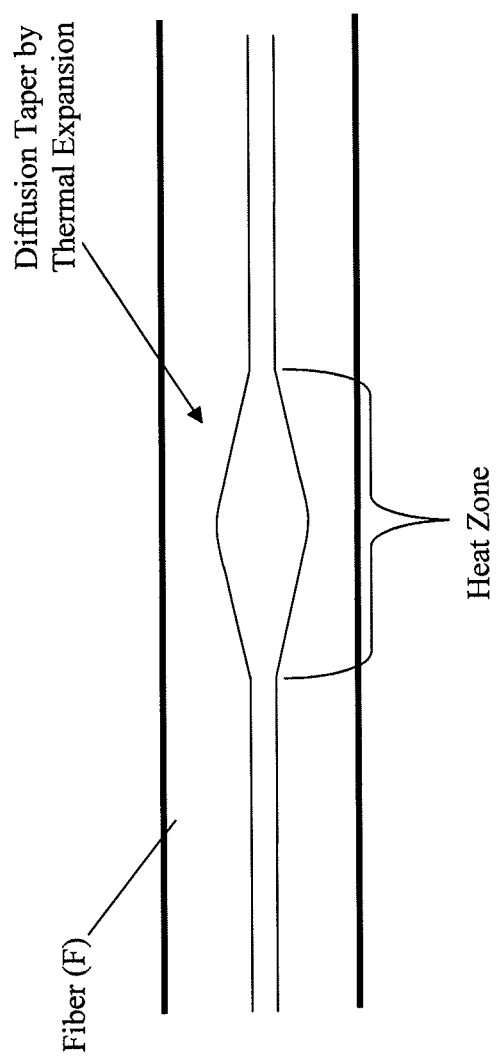
FIG. 4 is a cross-sectional view of an example of a fiber having a diffusion taper formed by thermal expansion.

FIG. 4 shows a cross-sectional side view of an example of a fiber having a diffusion taper of the core using a thermal mechanical diffusion system and method according to the present invention. The taper is created by expansion of the core caused by the diffusion. As can be seen, the diffusion profile has its largest diameter at its center, this is where the fiber would typically be cleaved. The heat zone is about the width of the diffusion profile in this embodiment.

Thermal mechanical diffusion can be performed at different areas of the fiber F within the heat zone to create the desired diffusion profile. The different vibration frequency and/or amplitude can be used in different areas, and the areas can overlap if necessary. For example, rapid diffusion can be applied to a first area of the fiber, then an adjacent second area of the fiber, and so on.

The thermal power of the heat source, vibration amplitude, and/or vibration frequency can be programmable (see FIG. 7). For instance, the diffusion profile shown in FIG. 4 could be achieved by applying thermal mechanical diffusion to 2 or more areas within the heat zone.

Returning to FIG. 3, the heat source preferably provides a substantially uniform heated field about the fiber, wherein the fiber is disposed so that a portion thereof is in the heated field. The heat source can take the form of any known or later developed heat source. For example, the heat source can be a two electrode heat source. The heat source can include a flame. The flame can be applied directly to the fiber, or applied to a crucible that surrounds the fiber. The heat source can be a filament heat source that substantially circumferentially surrounds some or all of the fiber. The filament heat source can include a Tungsten or graphite filament, as examples, or other types of known filaments. The laser can be a 10 μm CO2 laser. In still other embodiments, the heat source can be a multi-electrode heat source having three to more electrodes, as in FIGS. 5 and 6.

FIG. 5 is a side view of an embodiment of a thermal mechanical diffusion system 500, according to aspects of the present invention. Thermal mechanical diffusion system 500 includes a multi-electrode thermal source that generates a heated field. The Ring of Fire™ multi-electrode technology by 3SAE Technologies Inc., Franklin, Tenn., is an example of a multi-electrode thermal source that could be used. FIG. 5 shows a "Y" configuration of electrodes. See, for example, Robert Wiley and Brett Clark, *Large Area Isothermic Plasma for Large Diameter and Specialty Fiber Splicing*, Optical Society of America (2007), which is incorporated herein by reference as information relating to the Ring of Fire™ multi-electrode technology by 3SAE Technologies Inc.

In FIG. 5, there are three thermal electrodes shown (A, B, and C), which are arranged to form a heated field. In other embodiments, a different plurality of electrodes could be provided (e.g., 2 electrodes, 4 electrodes, and so on). The individual electrodes are generally known in the art, so not discussed in detail herein. In the demonstrated arrangement of FIG. 5, the electrodes can produce a heated field having a temperature in a range of about 100 C-about 3,000 C. The temperature used will typically depend on the makeup of fiber F—particularly the fiber's melting temperature. In the demonstrated arrangement of FIG. 5, the electrodes can produce a heated field having a width of about 1 mm at high power and about 500 μm at low power. In some embodiments, the heated field can be a heated plasma field.

In FIG. 3, at least one fiber F is held or secured by two fiber holders (FH1 and FH2). Fiber F is arranged to pass through the heated field, as is shown. In the preferred embodiment, the electrodes are arranged substantially perpendicular to fiber F. In this embodiment, fiber F can be considered to be on a Z axis, as shown in FIG. 5 and the multi-electrode thermal source can be in the X-Y plane. While presently preferred, this may not necessarily be the arrangement in all embodiments. For example, there may be embodiments where the heated field is angled with respect to the Z axis and fiber F.

In this embodiment, fiber F is securely held in fiber holders FH1 and FH2. Fiber holder FH2 remains fixed. However, fiber holder FH1 is caused to vibrate. For illustrative purposes, fiber holder FH1 is coupled to a piezo as a vibration mechanism. When power is applied to the piezo it vibrates, causing fiber holder FH1 to vibrate. This vibration results in a small push and pull (push-pull) action on fiber F, along its axis (the Z axis). The piezo vibrates with an amplitude and frequency that can be selectively chosen or programmed into a controller. This push and pull motion results in a rapid diffusion within the fiber area that is within the heat zone.

FIG. 6 is a view of an embodiment of a thermal mechanical diffusion system 600 similar to the thermal mechanical diffusion system 500 of FIG. 5. However, in this embodiment, the multi-electrode heat source arranges 3 electrodes in a "T" configuration. The embodiment is otherwise similar to that of FIG. 5.

FIG. 7 is an embodiment of a programmable thermal mechanical diffusion system 700, according to aspects of the present invention. The programmable system can include the thermal mechanical diffusion system 300, 500, 600 discussed above, which is coupled to a programming interface 710. In addition to other optionally programmable features or parameters discussed herein, thermal mechanical diffusion system 300, 500, 600 can have programmable vibration amplitude and frequency. Programming can be included to apply thermal mechanical diffusion to more than one area of a fiber, e.g., to create a single diffusion profile within the fiber. Also, the temperature of the heat source could be programmable. In some embodiments, the thermal mechanical diffusion system 300, 500, 600 is contained or disposed in at least a partial vacuum.

In some embodiments, the fiber makeup, NA, and core diameter may be computer inputs, and one or more of vibration amplitude, vibration frequency, heat zone area(s), heat source temperature, and diffusion profile may be determined by a computer. For programmability purposes, a processor, memory, and controller can be arranged to set and control such parameters.

Figure 8:
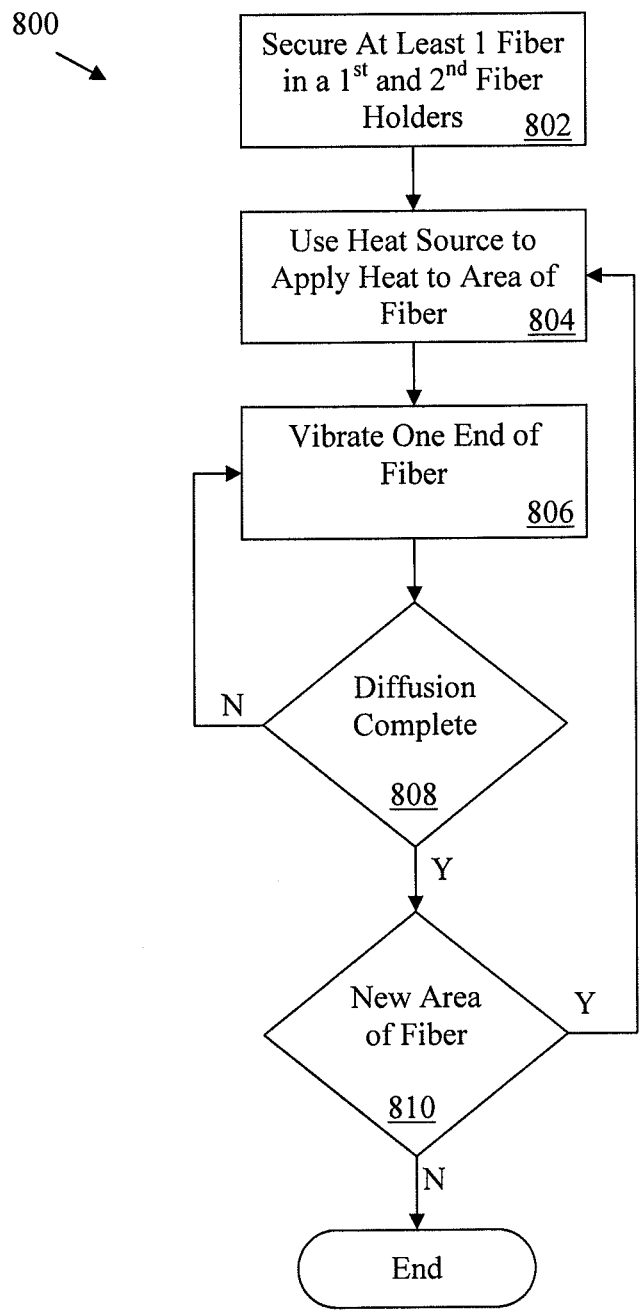
FIG. 8 is an embodiment of a thermal mechanical diffusion method, according to aspects of the present invention.

FIG. 8 is an embodiment of a thermal mechanical diffusion method 800, according to aspects of the present invention. As described above, first and second portions of a fiber (or fiber bundle) are respectively secured with a first fiber holder and a second fiber holder, step 802. The first fiber holder is coupled to a vibration mechanism. The second fiber holder can remain fixed. A heat source applies heat to an area of the fiber between the two fiber holders, step 804. The vibration mechanism causes vibration of the first fiber holder, with the fiber experiencing a resulting push and pull from the first fiber holder, step 806. As a result, rapid diffusion occurs in the fiber core. When diffusion is complete in the area, step 808, a determination can be made of whether or not thermal mechanical diffusion should be done in another defined area, which may or may not overlap with a prior area, step 810. As an example, this can be particularly useful for creating a diffusion taper within a fiber to be spliced, e.g., where the taper is a result of thermal expansion of the fiber core.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A thermal mechanical diffusion system useful to achieve rapid diffusion in optical fibers, the system comprising:
   a first fiber holder, configured to secure a first portion of at least one fiber;
   a second fiber holder, configured to secure a second portion of the at least one fiber;
   a vibration mechanism coupled to the first fiber holder, and configured to provide vibratory motion of the first fiber holder with respect to the second fiber holder; and
   a heat source configured to apply heat to a portion of the at least one fiber disposed between the two fiber holders during the vibratory motion.

2. The system of claim 1, wherein the vibration mechanism includes at least one piezo actuator.

3. The system of claim 1, wherein the vibration mechanism causes a predetermined vibration of the first fiber holder.

4. The system of claim 1, wherein the vibration mechanism causes a push-pull action on the at least one fiber.

5. The system of claim 1, wherein the second fiber holder maintain the second portion of the fiber in a fixed position relative to the first fiber holder.

6. The system of claim 1, wherein a frequency of the vibration is in a range of about 1 Hz-100 Hz.

7. The system of claim 1, wherein an amplitude of the vibration is in a range of about 1-100 μm.

8. The system of claim 1, wherein the amplitude of vibration is in a range of about 1-25 μm.

9. The system of claim 1, wherein the heat source generates a substantially uniform heated field about the fiber.

10. The system of claim 1, wherein the heat source has a thermal profile of about 1 mm or less.

11. The system of claim 1, wherein the heat source is a multi-electrode heat source having at least two electrodes.

12. The system of claim 11, wherein the heat source includes 3 electrodes.

13. The system of claim 1, wherein the heat source is a filament heat source that substantially surrounds a circumference of the at least one fiber.

14. The system of claim 1, wherein the heat source is a $CO_2$ laser.

15. The system of claim 1, wherein a portion of the fiber receiving the heat is a heat zone, and the heat zone is wider than the heated field of the heat source.

16. A method of causing rapid thermal diffusion in optical fibers, the method comprising:
    securing a first portion of at least one fiber in a first fiber holder;
    securing a second portion of the at least one fiber in a second fiber holder; and
    vibrating the first fiber holder with respect to the second fiber holder, while applying heat to a portion of the at least one fiber disposed between the two fiber holders to achieve diffusion of dopants within the at least one fiber.

17. The method of claim 16, further comprising performing the vibrating and heating to more than one area of the fiber.

18. The method of claim 16, further comprising controlling at least one of a vibration amplitude and a vibration frequency with a programmable computer.

19. The method of claim 16, further comprising controlling a thermal profile of the heat source with a programmable computer.

20. The method of claim 16, further comprising controlling a diffusion profile of the at least one fiber with a programmable computer.

21. The method of claim 16, further comprising diffusing the dopants within the at least one fiber by performing the vibration and heating for not more than about 1 minute.

22. The method of claim 16, further comprising diffusing the dopants within the at least one fiber by performing the vibration and heating for not more than about 10 seconds.

23. The method of claim 16, wherein a heat source generates the heat to have a substantially uniform heated field about the at least one fiber.

24. The method of claim 17, wherein the heat source has a thermal profile of about 1 mm or less.

25. The method of claim 16, wherein the heat source is a multi-electrode heat source having at least two electrodes.

26. The method of claim 16, wherein the vibration is caused by at least one piezo having a frequency of vibration in a range of about 1 Hz-100 Hz.

* * * * *